US008063348B1

(12) United States Patent
Swaminathan et al.

(10) Patent No.: US 8,063,348 B1
(45) Date of Patent: Nov. 22, 2011

(54) DUAL COLOR RETRO-REFLECTION SENSING DEVICE

(75) Inventors: Venkataraman Swaminathan, Bridgewater, NJ (US); Paul D. Willson, Rockaway, NJ (US); Deepak Bupathi, East Brunswick, NJ (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 310 days.

(21) Appl. No.: 12/476,581

(22) Filed: Jun. 2, 2009

(51) Int. Cl.
*G01C 21/02* (2006.01)
*G06M 7/00* (2006.01)

(52) U.S. Cl. .................. 250/203.1; 250/221

(58) Field of Classification Search .......... 250/221, 250/203.1, 559.29–559.32, 206.1, 206.2, 250/214 R; 356/3.01–3.03, 3.08, 3.1–3.12, 356/4.01, 152.3; 348/135, 139, 140, 142, 348/169; 396/89, 153; 434/16, 17, 21, 22, 434/19, 11; 235/404, 414–416; 345/555–557; 463/51, 52

See application file for complete search history.

(56) References Cited

U.S. PATENT DOCUMENTS

| 6,046,799 A | * | 4/2000 | Lysen | 356/139.1 |
| 2010/0321668 A1 | * | 12/2010 | Ueno | 356/4.01 |

* cited by examiner

*Primary Examiner* — Que T Le
*Assistant Examiner* — Pascal M Bui Pho
(74) *Attorney, Agent, or Firm* — Michael C. Sachs

(57) ABSTRACT

A system for detection of optical type devices being used by an enemy sniper subject without alerting the enemy is shown. A coherent laser beam of a wave length in the visible color range, is sent along an axis and passing through a beam splitter device. A detection means is arranged to generate a signal when it detects retro-reflections from the target optical devices or subject including clutter reflections in a 180 degree direction relative to axis. The detection means is coaxially mounted with the source of illumination with a second detection means off axis therefrom to generate a second detection signal when it detects clutter reflections from the target optical devices or subject. A comparator means forms a difference signal between the retro-reflected detection signal and the second detection signal and indicates when the difference signal exceeds a predetermined threshold.

7 Claims, 3 Drawing Sheets

DUAL COLOR RETRO-REFLECTION SENSING DEVICE

U.S. GOVERNMENT INTEREST

The inventions described herein may be made, used, or licensed by or for the U.S. Government for U.S. Government purposes.

BACKGROUND OF INVENTION

One of the operational challenges for combat forces is in counter-sniper operations. Optical augmentation (OA) techniques can be used for sniper detection and interception. In this invention, detection of retro-reflection from a target optics of a transmitted light source is used as the detection approach. Implementation of this retro-reflection approach is by transmitting a light source and observing its reflection from a distant optics co-axially with respect to the illuminating source. Co-axial reflection is from retro-reflection. Other, specular and diffuse type reflections from a targeting optics as well as other reflecting objects would give rise to clutter in the sensor, causing false alarm detections. Clutter error is corrected by using a second sensor that is laterally shifted relative to the axis of illumination of the source. This sensor would collect all reflections such as specular and diffuse reflections that would otherwise give rise to clutter. Since the co-axial sensor would receive the desired retro-reflection (though, plus clutter of specular and diffuse reflections), a differential signal of the co-axial and off-axial sensors would tend to yield a true retro-reflection component signal. This differential measurement is expected to vastly reduce false alarms for retro-detection. In addition to detecting the targeting optics, there is capability of discriminating and classifying various different types of optics used by a sniper, e.g., since the reflecting properties of the optics would have a spectral dependence, different wavelengths of illumination would be expected to produce different intensities of the retro-reflections. Select targets for detection in this invention would be of a sniper and especially his/her weapon. Retro-reflection of various wavelength (colors) may be from a human eyeball (particularly the retina), gun scopes (particularly the reticle on a gun sight telescope), and cameras, e.g., and these have known, target wavelengths. Ordinarily in the noise detected as opposed to retro-reflection detected categories would be stray metals, glass, headlamps of a car, which ordinarily provide only diffuse reflections or mirrors which ordinarily provide only specular type reflections. The illumination sources in this invention can be used either simultaneously or alternatively dictated by the frame rate of the system. Both these sources will provide co-axial illumination of the threat target area. The retro-reflections from the target will be at the spectral wavelengths of the two illumination sources. Each of these sensors will have adequate sensitivity to detect the retro-reflected light at the corresponding wavelength of the illumination source. Thus, a target optics can be detected.

OBJECTS OF THE INVENTION

It is therefore an object of the present invention to provide means for a combat soldier to remotely detect snipers, and optical equipment being used by such snipers, without alerting the enemy.

Other objects, features and advantages of the present invention will become more apparent in light of the following detailed description of the preferred embodiment thereof.

BRIEF SUMMARY OF INVENTION AND DESCRIPTION OF DRAWINGS

According to an embodiment of the present invention shown, these and other objects are accomplished by a target detection system having sketches, in which.

DETAILED DESCRIPTION

Figure 1:
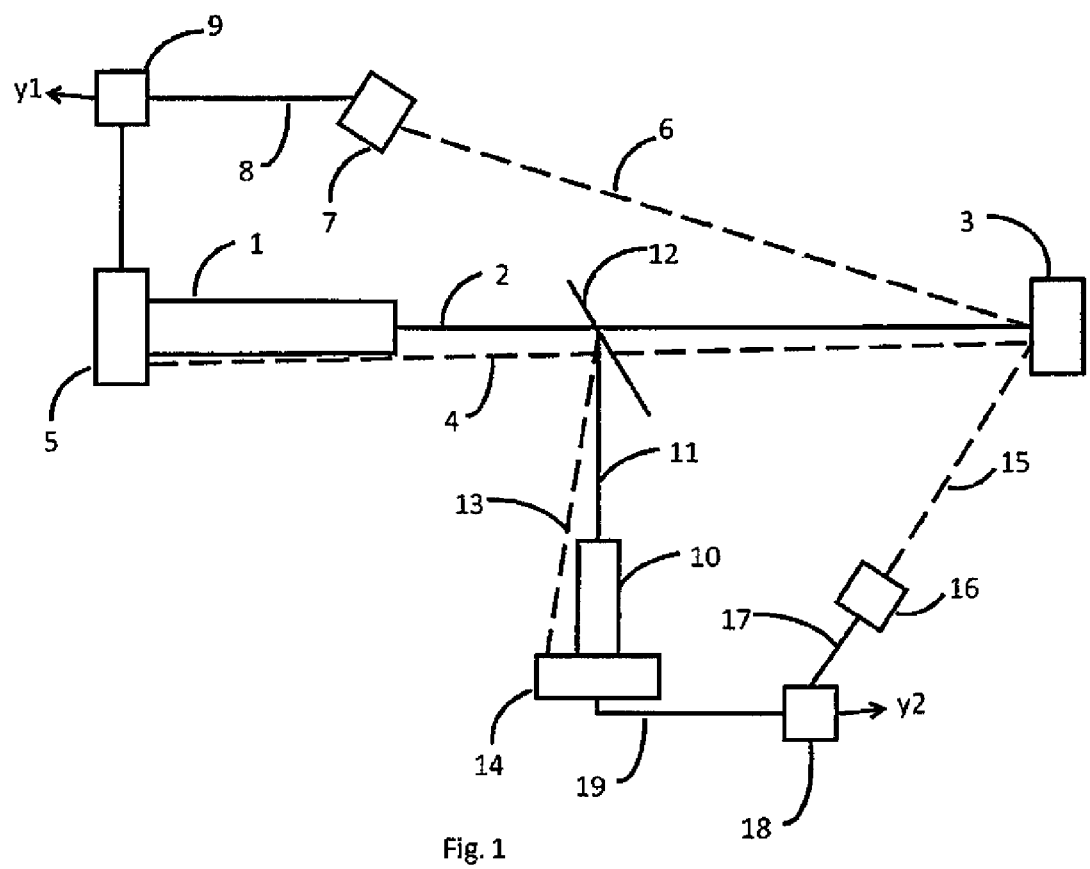
FIG. 1 shows a target detection system according to one embodiment of the invention.

In FIG. 1, a beam 2 (such as a laser beam) of a first wavelength is projected by a source 1 in direction of a suspected target 3. Retro reflected back from target 3 is beam 4 (nearly at a 180 degree angle so that it can be sensed at sensor 5). Also reflected back is an off line signal which is sensed at sensor 7, along line 6, which off line signal is also related in some way to suspected target 3. The placement of sensor 7 is such that it gives efficient discrimination of beams 4 and 6, otherwise it is positioned as may be convenient. The sensing of signal 4 at sensor 5 is more or less considered a retro-reflected full return signal on the originally projected signal 2 (but also added therein is some unwanted reflected noise signals), however, the reflected signal 6 sensed at sensor 7 is considered an off line, completely different type of signal than 4. Signal 6 might be considered as the background clutter (noise) level caused by random reflections from suspected target 3. The illumination level detected at sensor 7 fed to comparator 9 along line 8 along with the illumination level detected at sensor 5. At 9, through various computational algorithms (not shown here), the illumination levels are differenced as well as added, and a ratio taken of difference to added levels. This ratio is herein termed as a signal to noise ratio. If a threshold signal to noise ratio is crossed a positive signal will appear at Y1. The threshold level or the desired signal to noise ratio as defined here will be set depending on the sensitivity of the sensors 5 and 7 and other factors such as the background solar flux. As an example, a sought after ratio here would be over 0.75. The difference of the illumination signals indicates retro reflection from 2 toward targeted device 3, which is known to respond at that wavelength originally projected out in 2. Using this formula for general signal to noise ratio, (which is implemented at comparator 9 through computational means (not shown here), the on signal return (I=illumination amounts, $\lambda$ is wavelength identifier) from sensor 5, and the off line signal return from sensor 7, one could locate presence of a sought after target known to retro-reflect at a unique wavelength, where a relatively higher signal to noise ratio is shown than for other types of targets that were illumined with beam 2.

$$SNR(\lambda 1) = \frac{I_{on}^{\lambda 1} - I_{off}^{\lambda 1}}{I_{on}^{\lambda 1} + I_{off}^{\lambda 1}}$$

Figure 2:
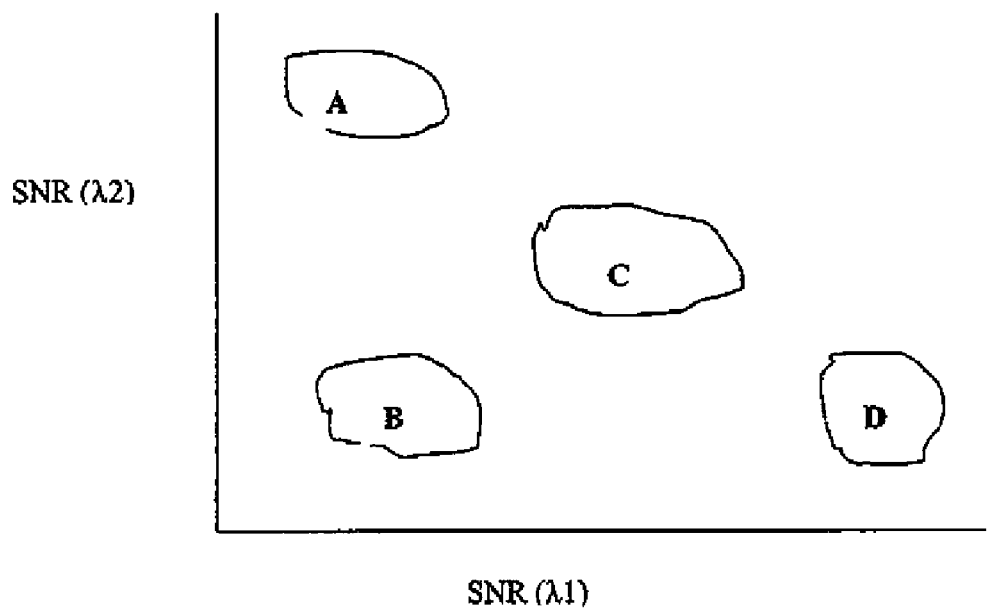
FIG. 2 shows a signal to noise graph which is useful in identifying detected targets.

Looking rightward along the X-axis in FIG. 2, for example, a suspected target might be seen at D there because it seems to have a high signal to noise ratio. This being at a select wavelength that was projected out, selected because retro-reflection at that wavelength would be expected if a particular target were present (which is being sought out because of the wavelength). In other words, use of wavelength, $\lambda$ (1) gives a clear detection and discrimination of target D as opposed to when a different wavelength, e.g., λ (2) is used.

Source 10 projects at a different wavelength than does source 1. If considering certain wavelengths, as for example, in the visible to near infrared light spectrum (400 to 900 nanometers), it could be said that source 10 projects at a different color of light than source 1. It is expected to arrange beam projections in alternate step signals from source 10 and then from source 1, in this embodiment; in actuality, multiple colors could be projected in one beam, or even broad waveband incoherent white light or other light sources such as light emitting diodes covering a wide spectral range from 400 to 1700 nanometers. However, in such case the detectors 14 and 16 still would be searching at a particular different (second) wavelength than would be the particular wavelength being searched by detectors 5 and 7, to note. Source 10 projects a laser signal along beam 11 which, through beam splitter 12, is also projected in direction of suspected target 3, along more or less the same line as was beam 2. Retro reflected back from target 3 similarly (through beam splitter 12) is beam 13 (nearly at a 180 degree angle from signal 11 so that it can be sensed at sensor 14). Also reflected back is an off line signal which is sensed at sensor 16, along line 15, which off line signal is (similarly to 6) also related in some way to suspected target 3. The placement of sensor 16 is such that it gives efficient discrimination of beams 11 and 15 and also for convenience. Even though a signal such as 15 could be arranged to be picked up in the field of the beam splitter returns (as was done for 13), it can also be done as shown here, not in the field of beam splitter return signals. The illumination level detected at sensor 16 is fed to comparator 18 along line 17 along with the illumination level along line 19 detected at sensor 14. At 18, through computational algorithms (not shown here), the illumination levels are differenced as well as added, and a ratio taken of difference to added levels according to the equation (s) here below. This ratio is here in termed as a signal to noise ratio. If a threshold signal to noise ratio is reached this may appear as a signal at Y2. The threshold level or the desired signal to noise ratio as defined here will be set depending on the sensitivity of the sensors 14 and 16 and other factors such as the background solar flux. As an example, a sought after ratio here would be over 0.75. A Y2 result is of course for a different wave length than for a Y1 result, and hence a different sniper optic would be detected than at Y1.

In order to decrease the false alarm rate and improve the rates of detection, a type of differential measurement can be made using the system shown in FIG. 1 to improve discrimination and classification of a target. The signal-to-noise (SNR) ratios of the retro-reflected illumination signals at wavelengths λ1 and λ2, respectively, are plotted against one another on the two axes of FIG. 2.

$$SNR(\lambda 1) = \frac{I_{on}^{\lambda 1} - I_{off}^{\lambda 1}}{I_{on}^{\lambda 1} + I_{off}^{\lambda 1}}$$

$$SNR(\lambda 2) = \frac{I_{on}^{\lambda 2} - I_{off}^{\lambda 2}}{I_{on}^{\lambda 2} + I_{off}^{\lambda 2}}$$

Such can be expected to show clusters of retro-reflection signals, representing groups of targets such as A, B, C and D shown in FIG. 2. One group is likely to have strong retro-reflection, e.g., for λ1 (Group D) and another, e.g., for λ2 (Group A). Some target optics could have equally strong (Group C), e.g., or equally weak, e.g., (Group B) retro-reflections for both wavelengths. Such a graph (spectral map) could help to identify and classify targets when such are detected. Another version of the invention utilizes two co-axially placed sensors for the two wavelengths of the illumination sources, and four illumination sources, two for each of the two wavelengths. For each wavelength of illumination, one source will be co-axially placed with the sensor and another will be placed off-axially with reference to the sensor. While the invention has been described with reference to certain preferred embodiments, numerous changes, alterations and modifications to the described embodiments are possible without departing from the spirit and scope of the invention as defined in the appended claims, and equivalents thereof. For example, when multiple wavelength sources are used such as broad band white light, lasers or light emitting diodes operating at different wavelengths or tunable sources of lasers and light emitting diodes that can cover a wide spectral range, a hyperspectral or multispectral sensor can be used to detect the retro-reflected and non-retro-reflected reflections. Alternatively, a hyperspectral sensor with an illumination source can be used.

Figure 3:
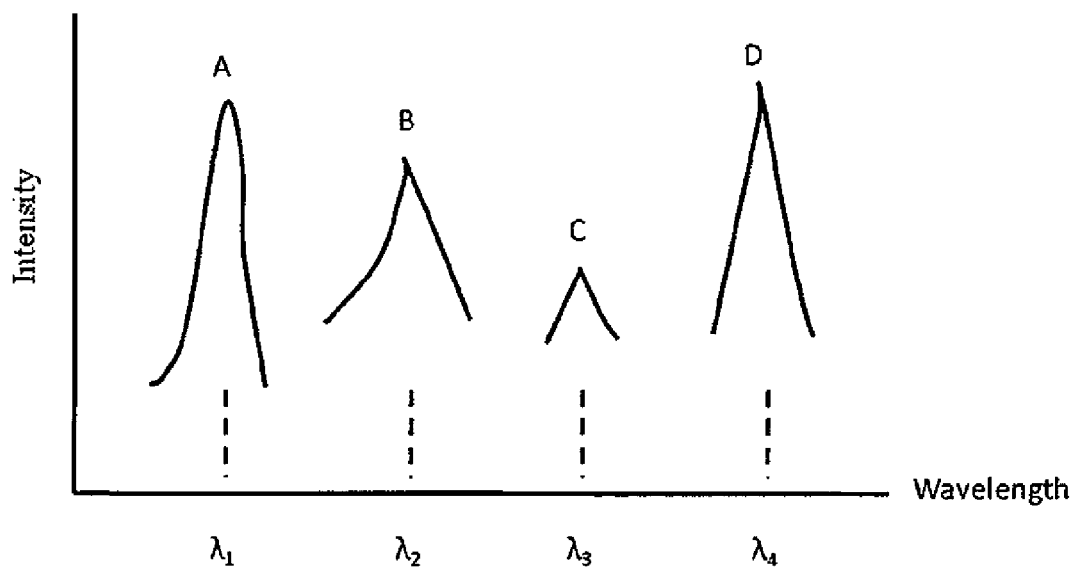
FIG. 3 shows a multi-spectral display of retro reflection activity at multiple frequencies.

In FIG. 3, a graph is shown receiving four frequencies, for instance, (herein called λ1, λ2, λ3, and λ4). In this fashion, a multicolor (multiple simultaneous frequencies) system could be made to work with yet many more frequencies, capable of being searched simultaneously.

What is claimed is:

1. A system for detection of at least two different target optical type devices being used by an enemy sniper subject without alerting the enemy, said system comprising:

a first source of illumination to transmit at the subject a coherent laser beam of a first wave length in the visible color range, along a first axis and passing through a beam splitter device; a first detection means to generate a first detection signal when it detects retro-reflections from the target optical devices or subject including clutter reflections in a 180 degree direction relative to the first axis, said first detection means coaxially mounted with said first source of illumination, and a second detection means off axis from said first source of illumination to generate a second detection signal when it detects clutter reflections from the target optical devices or subject; a first means to form a first ratio of difference between said first detection signal and said second detection signal all divided by sum of first detection signal and said second detection signal, and; a means to ascertain if said first ratio exceeds a predetermined first threshold which would indicate detection of a searched for first type of optical device, and;

a second source of illumination to transmit at the subject a coherent laser beam of a second wave length in the visible color range along a second axis toward the beam splitter device where it is redirected along said first axis toward the subject; a third detection means to generate a third detection signal when it detects retro-reflections from the target optical devices or subject including clutter reflections travelling via said beam splitter device redirected along said second axis in a 180 degree direction relative to said second axis, said third detection means coaxially mounted with said second source of illumination, and a fourth detection means off axis from said second source of illumination to generate a fourth detection signal when it detects clutter reflections from the target optical devices or subject; a second means to form a second difference signal between said third detection signal and said fourth detection signal, and; a means to ascertain if said second difference signal exceeds a predetermined threshold which would indicate detection of a searched for second type of optical device.

2. The system of claim 1 where the first and second ratios both exceed 0.75.

3. The system of claim 1 where the first and second ratios both exceed 0.80.

4. The system of claim 1 where the first and second ratios both exceed 0.85.

5. The system of claim 1 where the first and second ratios both exceed 0.90.

6. The system of claim 1 where the first and second ratios both exceed 0.95.

7. The system of claim 1 embodying multiple color simultaneous detection of retro reflections comprising a broad band light source simultaneously transmitting illumination at many frequencies, and a multispectral sensor to simultaneously detect retro reflections at multiple select frequencies of interest which correspond to detection of searched for types of optical devices being employed by a subject.

* * * * *